United States Patent [19]

Sekine et al.

[11] Patent Number: 5,066,878
[45] Date of Patent: Nov. 19, 1991

[54] SMALL-SIZED ELECTRIC MOTOR HOUSING CIRCUIT BREAKER

[75] Inventors: Shuji Sekine; Takeo Furuya; Katsuhiro Sato, all of Yokohama, Japan

[73] Assignee: Jidosha Denki Kogyo K.K., Kanagawa, Japan

[21] Appl. No.: 628,138

[22] Filed: Dec. 17, 1990

[30] Foreign Application Priority Data

Dec. 18, 1989 [JP] Japan ............... 1-145707[U]

[51] Int. Cl.⁵ ............................................. H02K 11/00
[52] U.S. Cl. ........................... 310/68 C; 310/40 MM; 310/71
[58] Field of Search .............. 310/68 C, 71, 89, 239, 310/249, 264, 40 MM; 335/6, 40, 71

[56] References Cited

U.S. PATENT DOCUMENTS

| 4,209,723 | 6/1980 | Hamman | 310/89 |
| 4,293,789 | 10/1981 | King | 310/68 C |
| 4,801,833 | 1/1989 | Dye | 310/239 |
| 5,025,184 | 6/1991 | Sekine et al. | 310/71 |

Primary Examiner—Steven L. Stephan
Assistant Examiner—Edward H. To
Attorney, Agent, or Firm—Sughrue, Mion, Zinn, Macpeak & Seas

[57] ABSTRACT

A small-sized electric motor is provided with a hole for inserting a circuit breaker in a holder base lying between a motor case and a gear case, and the circuit breaker is fixed to the holder base by inserting its own body in the hole of the holder base together with terminals at the state in which the terminals are in contact with electrical connective plates of the circuit breaker respectively, it is possible to fix up the circuit braker to the holder base of the motor by merely press-fitting and becomes possible to automate the assembly of the motor housing and the built-in circuit breaker.

4 Claims, 4 Drawing Sheets

SMALL-SIZED ELECTRIC MOTOR HOUSING CIRCUIT BREAKER

BACKGROUND OF THE INVENTION

1. Field of the Invention

This invention relates to a small-sized electric motor used for driving a window glass in a power window device of an automobile, for example, and more particularly to a small-sized electric motor housing a built-in circuit breaker.

2. Description of the Prior Art

Heretofore, there has been used a small-sized electric motor housing a built-in circuit breaker as shown in FIG. 5 and FIG. 6.

In the small-sized electric motor 100 shown in the figures, an armature 105 is held rotatably by a gear case 102 and a motor case 104 attached to the gear case 102 with a screw 103, and a holder base 106 is fitted between the gear case 102 and the motor case 104.

The holder base 106 is provided with a circular hole 106a for inserting a commutator 105b provided to an armature shaft 105a of the armature 105 in the center portion thereof, and resilient brush holders 108 and 109 fitted with brushes 107 to supply an electric current to the armature 105 are attached to the opposite positions around about the circular hole 106a, respectively.

The holder base 106 is also provided with holding holes 106b and 106c to hold connective terminals 110a and 110b of a circuit breaker 110 at positions away from the brush holders 108 and 109 on the outside of the circular hole 106a, and the connective terminals 110a and 110b are pressed into the holding holes 106b and 106c.

The connective terminal 110a between the connective terminals 110a and 110b is connected with an end of a wire 111 by spot welding, and another end of the wire 111 is connected to the brush holder 108 by spot welding.

Another connective terminal 110b between the connective terminals 110a and 110b is connected with an external connective wire 112 by spot welding, and another brush holder 109 is connected with another external connective wire 113 by spot welding.

In this state, supplying the predetermined power through the external connective wires 112 and 113, the electric current flows from the external connective wire 112 to another external connective wire 113 through the connective terminal 110b of the circuit breaker 110, the connective terminal 110a of the circuit breaker 110, the wire 111, the brush holder 108, the brush 107, the commutator 105b, the armature 105, the brush 107 and the brush holder 109, so that the armature shaft 105a rotates in FIG. 6. Thereby a worm wheel 114 rotates by meshing with a worm 105c formed to the armature shaft 105a, and an output shaft 115 fixed to the worm wheel 114 rotates.

If the output shaft 115 is loaded and the rotation of the output shaft 115 is restricted from one cause or another, then an overcurrent flows in the circuit breaker 110 and the electric connection between the connective terminals 110a and 110b is cut off by working of bimetal.

In this manner, the motor 100 is so structured as not to pass the overcurrent into the armature 105 and prevent the armature 105 from burning out.

However, in the abovementioned conventional small-sized electric motor 100, the circuit breaker 110 is held in the holder base 106 by pressing the connective terminals 110a and 110b into the holding holes 106b and 106c provided in the holder base 106 respectively, and the connective terminal 110a of the circuit breaker 110 is connected to the one end of the wire 111 by spot welding and another connective terminal 110b of the circuit breaker 110 is connected with the external connective wire 112 by spot welding. Therefore, there is a problem in that it is unfavorable in the cost because the assemble work requires many man-hours for connecting the respective connective terminals 110a and 110b with the one end of the wire 111 and the external connective wire 112 by spot welding after pressing the connective terminals 110a and 110b into the holding holes 106b and 106c. There is another problem in that it is difficult to assemble automatically since the positioning work of the external connective wire 112 and the wire 111 is very troublesome.

SUMMARY OF THE INVENTION

This invention is made in view of the aforementioned problems of the prior art, and it is an object to provide a small-sized electric motor housing a circuit breaker which can be inexpensively and automatically assembled.

The construction of the small-sized electric motor according to this invention for attaining the aforementioned object is characterized by comprising an armature provided with a commutator, a brush holder holding a brush in contact with said commutator of the armature, a terminal connected electrically with said brush holder, a holder base attached with said terminal and provided with a hole, and a circuit breaker having an electrical connective plate and inserted into said hole of the holder base together with said terminal at a state in which said electrical connective plate is in contact with the terminal.

In the small-sized electric motor according to this invention, the circuit breaker is held in the holder base by inserting inself into the hole provided in the holder base together with the terminal at the state in which the terminal is in contact with the electrical connective plate of the circuit breaker. Therefore, it is not necessary to connect the connective terminals with the wires by spot welding.

DESCRIPTION OF THE PREFERRED EMBODIMENT

Figure 1:
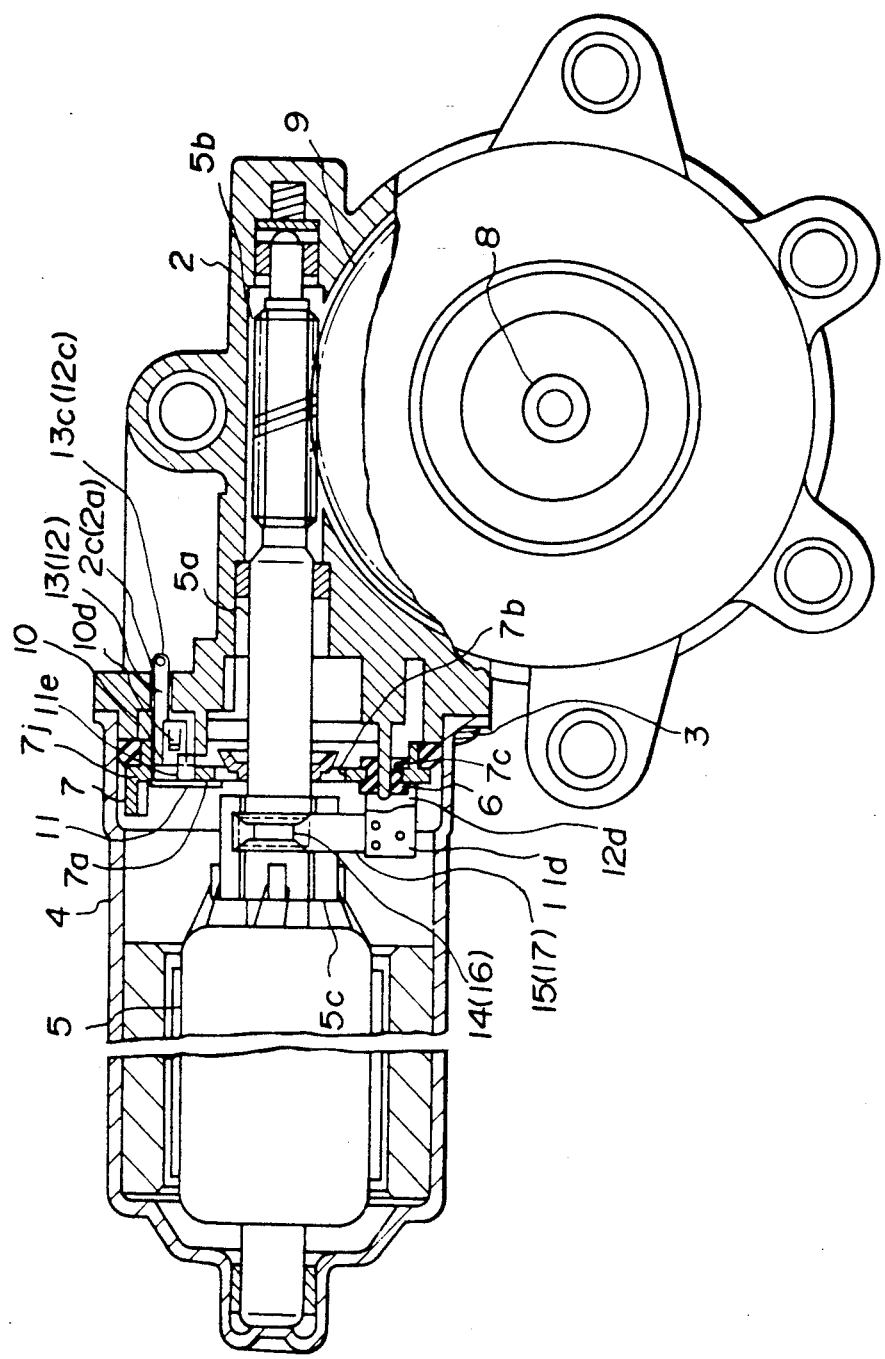
FIG. 1 is a vertical sectional view showing the structure of the small-sized electric motor according to an embodiment of this invention.

A small-sized electric motor according to an embodiment of this invention will be explained below in connection with FIGS. 1 to 4.

In the small-sized electric motor 1 shown in the figures, an armature 5 is supported rotatably by a gear case 2 and a motor 4 attached to the gear case 2 with a screw 3, and a holder base 7 attached with grommets 6 is fitted between the gear case 2 and the motor case 4.

In the gear case 2, an armature shaft 5a of the armature 5 is formed with a worm 5b, and the worm 5b is meshed with a worm wheel 9 fixed with an output shaft 8.

Figure 3:
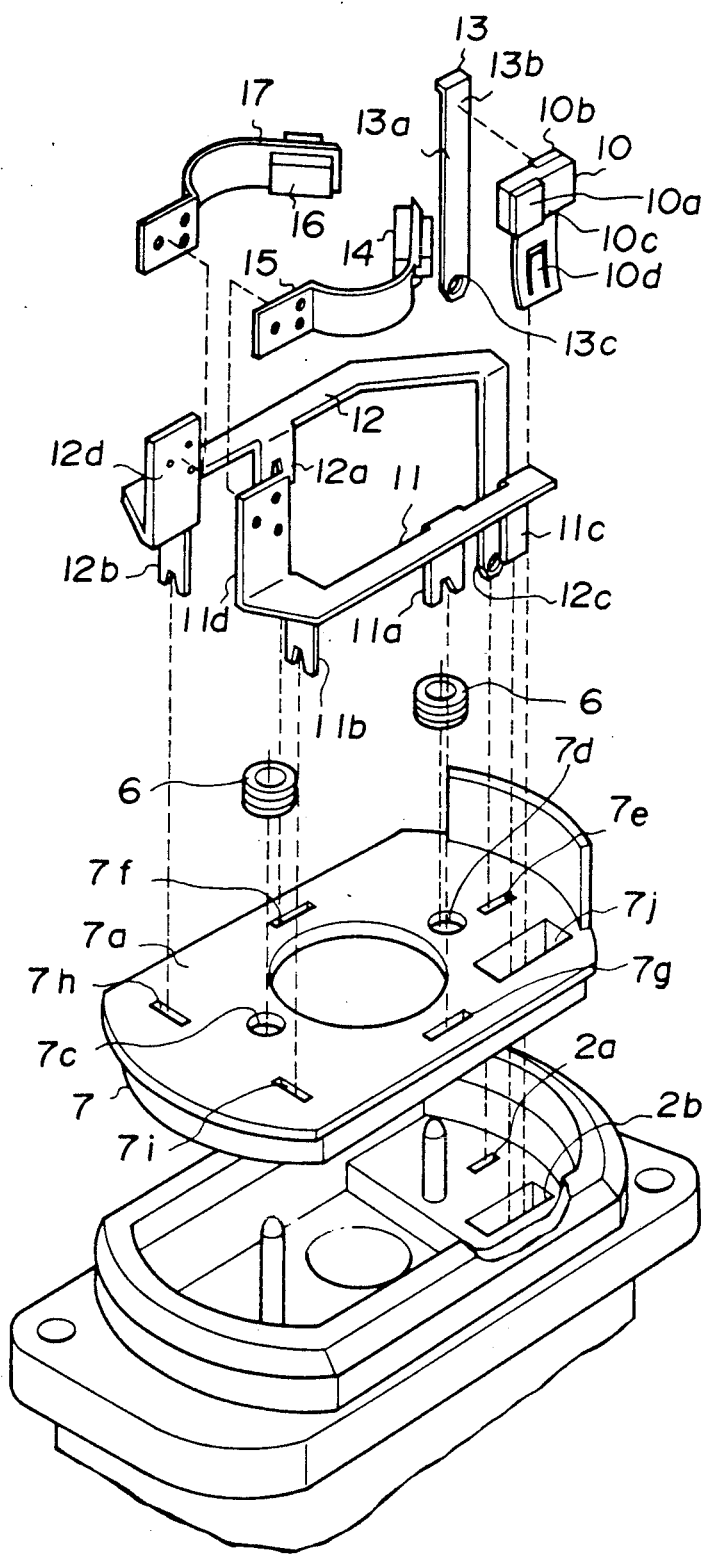
FIG. 3 is a perspective view illustrating the neighborhood of the holder base in the small-sized electric motor shown in FIG. 1.
Figure 5:
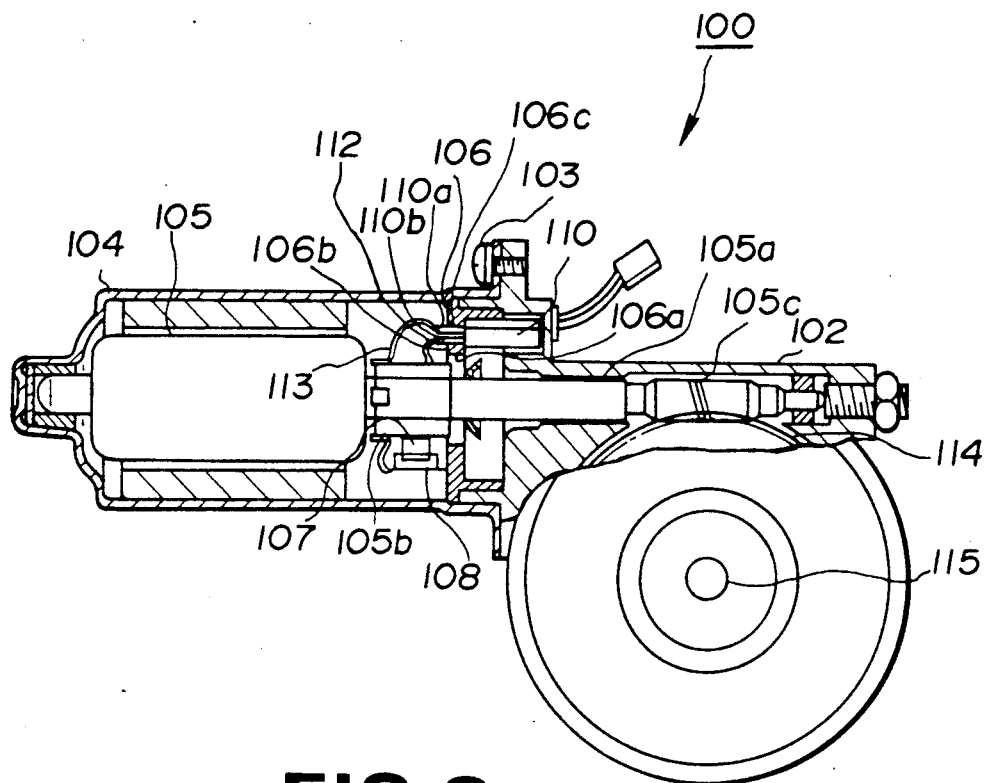
FIG. 5 and FIG. 6 are a vertical sectional view and a circuit diagram of the conventional small-sized electric motor, respectively.
Figure 6:
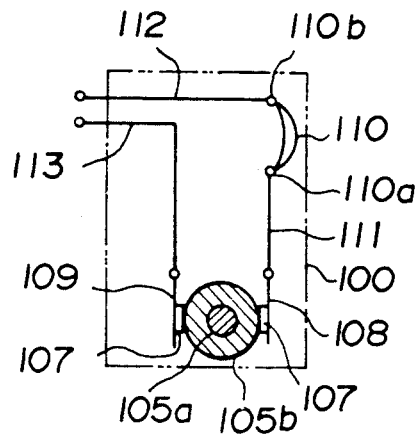

The holder base 7 is provided with a circular hole 7b for passing through a commutator 5c provided on the armature shaft 5a of the armature 5 in the center portion of a base body 7a formed in an oval shape as shown in FIG. 3, and the grommets 6 are fitted into grommet holes 7c and 7d provided around about the circuit hole 7b.

The holder base 7 is also provided with a terminal slit 7e at a position moved to the end portion on the outside of the circular hole 7b in FIG. 3, and provided with terminal slits 7f, 7g, 7h and 7i at the opposite positions on the outside of the circuit hole 7b, respectively.

And the holder base 7 is provided with a through hole 7j on the right side of the terminal slit 7e in FIG. 3, which is a rectangular opening to insert a circuit breaker 10 (which will be described later). The gear case 2 is provided with a terminal through hole 2a passing through from the inside of the motor case 4 to the outside of the gear case 2 and a circuit breaker containing part 2b at positions corresponding to the terminal slit 7e and the through hole 7j respectively on the side of the holder base 7 of the gear case 2, and the circuit breaker containing part 2b is provided with another terminal through hole 2c passing through from the inside of the motor case 4 to the outside of the gear case 2.

Figure 4:
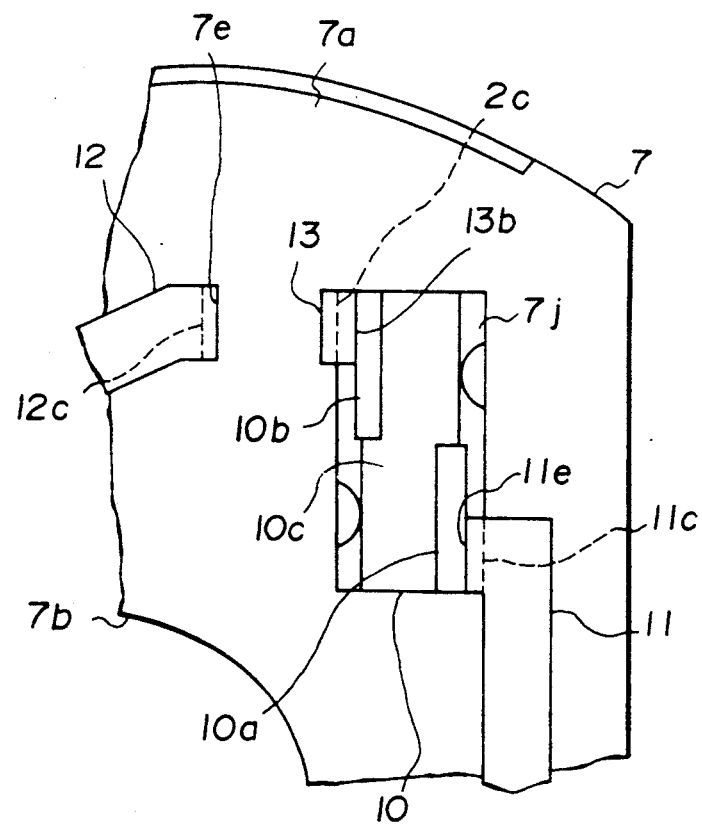
FIG. 4 is a side view showing the neighborhood of the circuit breaker in the small-sized electric motor shown in FIG. 1.

Each of holder retainer 11 and 12 and the terminal 13 is formed with electric-conductive plates, the holder retainer 11 is provided with fixing pieces 11a and 11b to be inserted in the respective terminal slits 7g and 7i provided in the holder base 7 so as to fix the holder retainer 11 to the holder base 7, an inserting piece 11c to be inserted in the lower right side corner of the through hole 7j together with the circuit breaker 10 as shown in the FIG. 4 and an attaching piece 11d to fix a brush holder 15 fitted with a brush 14 to be in contact with the commutator 5c. The inserting piece 11c is provided with a holding part 11e for holding one side of the circuit breaker 10 in the contacted state with an electrical connective plate 10a of the circuit breaker 10 on the left side thereof in FIG. 4.

The terminal 12 is provided with fixing pieces 12a and 12b to be inserted into the respective terminal slits 7f and 7h provided in the holder base 7 so as to fix the holder retainer 12 to the holer base 7, an external connective piece 12c extruding toward the outside of the gear case 2 through the terminal through hole 2a formed in the gear case 2 by inserting into the terminal slit 7e and an attaching piece 12d to fix another brush holder 17 fitted with a brush 16 to be in contact with the commutator 5c.

And the terminal 13 is provided with an inserting piece 13a to be fixed to the holder base 7 at the inserted state in the upper left side conner of the through hole 7j of the holder base 7 together with the circuit breaker 10 as shown in FIG. 4, a holding part 13b for holding another side of the circuit breaker 10 in the contacted state with another electrical contactive plate 10b of the circuit breaker 10 on the right side of the inserting piece 13a in FIG. 4, and an external connective piece 13c extruding toward the outside of the gear case 2 by passing through the terminal through hole 2c from the through hole 7j.

The connective plates 10a and 10b of the circuit breaker 10 are formed so as to extrude slightly on both sides from a breaker body 10c as shown in FIG. 4, and the circuit breaker 10 is so designed as to connect or disconnect the electrical connection between the electrical connective plates 10a and 10b by the working of a contact part 10d structured with bimetal corresponding to the strength of an electric current applied through the electrical connective plates 10a and 10b.

The circuit breaker 10 is held to the holder base 7 securely with the holding parts 11e and 13b at the state in which the electrical connective plate 10a of the circuit breaker 10 is in contact with the holding part 11e of the holder retainer 11 and another electrical connective part 10b of the circuit breaker 10 is in contact with the holding part 13b of the terminal 13 by pressing downwardly the circuit breaker 10 into the through hole 7j inserted with the inserting piece 11c of the terminal 11 and the inserting piece 13a of the terminal 13 as shown in FIG. 3.

Figure 2:
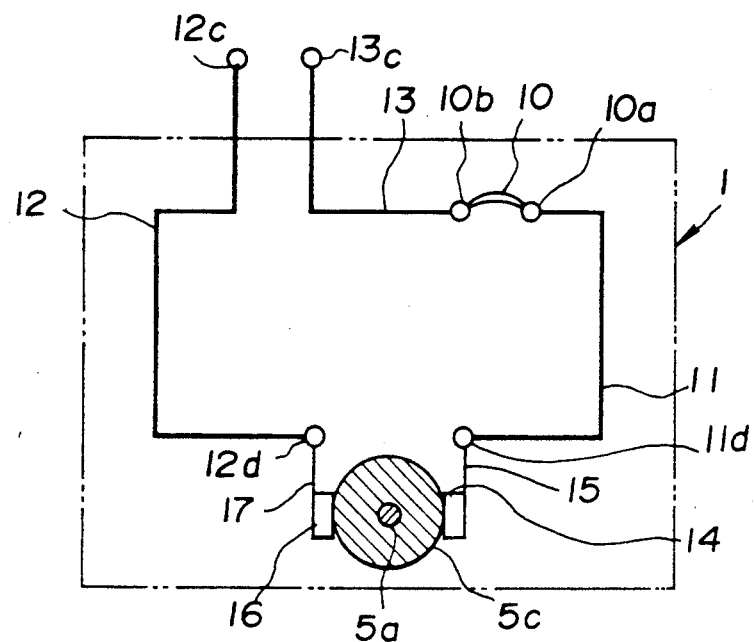
FIG. 2 is a diagram illustrating the circuit configuration of the small-sized electric motor shown in FIG. 1.

In the state, supplying the predetermined electric power through the external connective pieces 12c and 13c provided to the respective holder retainer 12 and terminal 13, the electric current flows from the holder terminal 12 to the terminal 13 through the brush holder 17, the brush 16, the commutator 5c, the armature 5 (armature coil), the commutator 5c, the brush 14, the brush holder 15, the holder retainer 11, the holding part 11e of the terminal 11, the electrical connective plates 10a and 10b of the circuit breaker 10, and the holding part 13b, so that the armature shaft 5a rotates in one direction in FIG. 2.

Thereby, the worm wheel 9 meshed with the worm 5b rotates and the output shaft 8 is structured so as to rotate in the forward direction, for example.

If an extraordinary load is applied on the output shaft 8 for some reason and the rotation of the output shaft 8 is restricted, the contact part 10d which is structured with bimetal works according to the over-current flowing in the circuit breaker 10 and the electrical connection between the electrical connective plates 10a and 10b is cut off so as to protect the armatuer 5 from the burning out.

As mentioned above, the small-sized electric motor according to this invention is provided with a hole to be inserted with a circuit breaker in a holder base, and the circuit breaker is fixed to the holder base by inserting its own body in the hole of the holder base together with a terminal at the state in which the terminal is in contact with an electrical connective plate of the circuit breaker. Therefore, according to this invention, it is possible to automate the assembly of the motor because the terminal and the circuit breaker become possible to be fixed up in the bolder base by merely press-fitting without connecting by spot welding, and an excellent effect is obtained since it is possible to economize the man-hour required to assemble the motor, remakably.

What is claimed is:

1. A small-sized electric motor comprising:
   an armature provided with a commutator;
   a brush in contact with the commutator of said armature;
   a metallic brush holder directly fitted with said brush;

a fixed metallic holder retainer electrically connected with said brush holder;

a metallic terminal plate;

an electrically insulative holder base attached with said holder retainer and provided with a hole; and a circuit breaker having a pair of electrical connective plates and inserted into said hole of said holder base together with said holder retainer and said terminal plate such that said electrical connective plates are in contact electrically with said holder retainer and said terminal plate so as to conduct an electric current to said armature through the terminal plate and the holder retainer.

2. The small-sized electric motor as set forth in claim 1, wherein said hole in the holder base is formed into a through hole.

3. The small-sized electric motor as set forth in claim 2, wherein said through hole is formed into a rectangular shape.

4. The small-sized electric motor as set forth in claim 2, wherein said circuit breaker has a rectangular shape.

* * * * *